July 14, 1959   J. A. BRADSHAW   2,894,591
CULTIVATOR TOOL UNIT AND PLANT SHIELD ASSEMBLY
Filed March 19, 1956
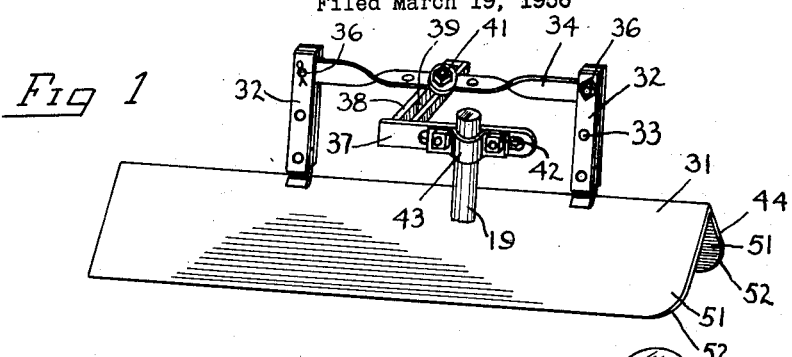
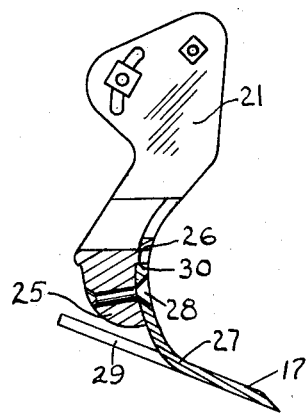
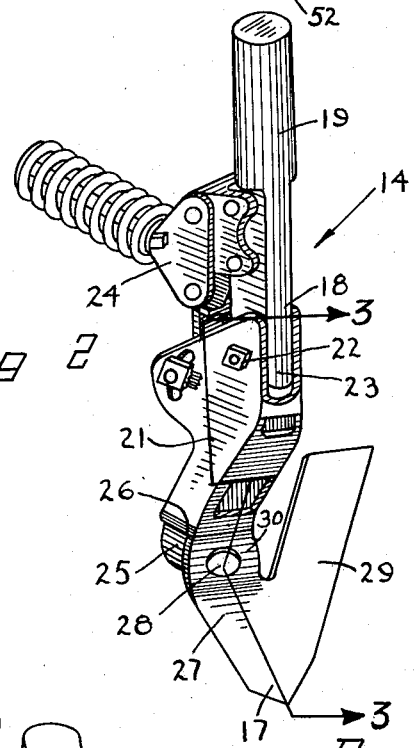
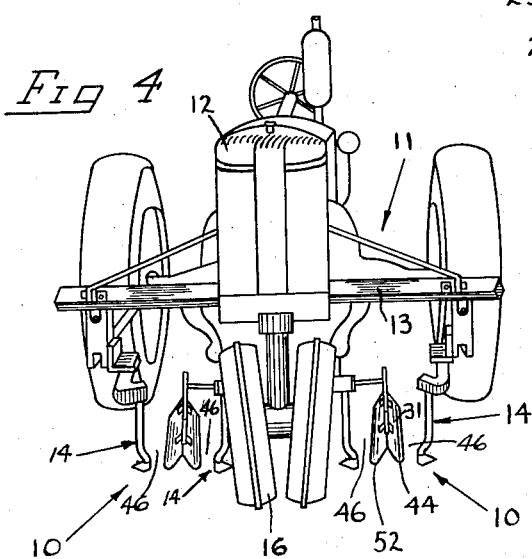
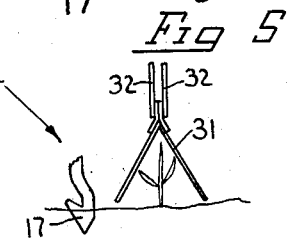
INVENTOR.
JOHN A. BRADSHAW
BY
ATTORNEY

United States Patent Office 2,894,591
Patented July 14, 1959

2,894,591

CULTIVATOR TOOL UNIT AND PLANT SHIELD ASSEMBLY

John A. Bradshaw, Gowrie, Iowa

Application March 19, 1956, Serial No. 572,345

1 Claim. (Cl. 172—512)

This invention relates generally to cultivators for farm tractors and more particularly to a cultivator tool unit and plant shield assembly for a cultivator.

An object of this invention is to provide an improved cultivator tool unit and plant shield assembly for cultivators.

Another object of this invention is to provide a cultivator tool unit and plant shield assembly which provides for unrestricted travel of dirt, clods, trash and the like between the shield and a cultivating or shoe unit.

Another object of this invention is to provide an improved cultivator tool unit capable of being mounted on cultivators now in use and adapted for use with a plant shield to eliminate the clogging of material between a shield and units on opposite sides thereof.

A further object of this invention is to provide a cultivator tool unit and plant shield assembly which is simple in construction, economical to manufacture and efficient in operation to eliminate any clogging of material between the shield and an adjacent cultivating tool so that the farmer does not have to continually leave the tractor and clear such material from around the shield as is now the case.

Further objects, features and advantages of this invention will become apparent from a consideration of the following description when taken in connection with the accompanying drawing in which:

Fig. 1 is a fragmentary perspective view of the plant shield of this invention, shown in assembly relation with a cultivator tool support, only a portion of which is shown:

Fig. 2 is a perspective view of a cultivator tool unit of this invention;

Fig. 3 is a vertical sectional view looking substantially along the line 3—3 in Fig. 2;

Fig. 4 is a front perspective view on a reduced scale of a farm tractor provided with a cultivator attachment equipped with the cultivator tool unit and plant shield assembly of this invention; and Fig. 5 is a front elevational view on a reduced scale of a shield and an adjacent tool unit.

With reference to the drawing, the cultivator tool unit and plant shield assembly of this invention, indicated generally at 10, is illustrated in Fig. 4 as a part of a cultivator attachment 11 mounted on a farm tractor 12. The cultivator attachment 11 includes a main frame 13 and a plurality of transversely spaced cultivator tool units 14 which are mounted on the frame 13 in a well known manner. Only the units 14 which are arranged in pairs on transversely opposite sides of a pair of front wheels 16 for the tractor 12 are illustrated and form any part of this invention.

Each unit 14 (Figs. 2 and 3) includes a tool member 17 and a tool supporting structure or shank 18 extended upwardly therefrom. The supporting structure 18 includes a usual substantially vertical bar member 19 and a body member 21 pivotally connected at 22 to the lower end 23 of the bar member 19. The usual spring assembly 24 is operatively associated with the members 19 and 21 for yieldably resisting any relative pivotal movement of the members 21 and 19 about the pivot 22.

The body member 21 is of a substantially U-shape in cross section, and is curved downwardly and transversely outwardly realtive to the lower end 23 of the bar member 19. The body member 21 terminates in a reduced extension 25, so as to form a shoulder 26 at the juncture of the body member 21 and its extension 25.

The tool member 17 (Fig. 2) is of a substantially V-shape, having a short leg 27 and a longer leg 29 inclined upwardly and outwardly at an angle relative to the short leg 27. A laterally inclined end portion 30 of the short leg 27 is positioned against the shoulder 26 and is secured to the extension 25 by a rivet 28.

As best appears in Fig. 4, the units 14 in each pair are mounted so that the tools 17 therefor have their short legs 27 positioned opposite each other with the tools 17 being spaced apart a predetermined distance to break the ground adjacent to and on opposite sides of a grain row to be cultivated.

Mounted midway between the tools 17 in each pair of units 14, is an elongated unitary plant shield member 31 (Figs. 1 and 5) of an inverted V-shape in transverse section. Intermediate its ends, the shield 31 is provided with a pair of upwardly extended longitudinally spaced strap units 32 each of which is provided with a plurality of vertically spaced openings 33. A strap 34 is pivotally connected at its ends to the strap units 32 by a pair of bolts 36 extended through the ends of the straps 34 and corresponding openings 33 in the units 32. An L-shape bracket 37 has one leg 38 thereof provided with a slot 39 which receives a bolt 41 connected to a central portion of the strap 34. A second leg 42 of the bracket 37 is adjustably connected ot the upper end of a bar 19 in a unit 14 by means of a clamp assembly 42.

It is seen, therefore, that by adjusting the leg 42 longitudinally of the bracket 43, and adjusting the leg 38 transversely of the strap 34, the position of the shield 31 relative to the bar 19 may be adjusted in directions both longitudinally and transversely of the shield 31. Accordingly, a shield 31 is readily mounted in a desired position between a pair of tools 17, with the shield 31 being supported on the support bar 19 for one of the tools 17.

In use, the vertical relation of the shield 31 to the tools 17 is adjusted by varying the holes 33 in which the bolts 36 are received. In other words, in cultivating corn when the corn is smallest, the strap 34 is connected in the openings 33 illustrated in Fig. 1 so that the shield 31 is relatively close to the ground. As the corn grows, the shield 31 is progressively moved upward by connecting the strap 34 to the strap assemblies 32 at successively lower openings 33 therein. When the corn is of a size large enough to obviate any danger of the corn being covered during cultivation, the shield 31 is removed. The connection of the L-shape bracket 37 to the strap 34 is adjusted so that the shield 31 is substantially midway between the tools 17 on opposite sides thereof. Further, the shield 31 is positioned so that the tools 17 on opposite sides thereof are closely adjacent to opposite sides of the shield 31 and are positioned adjacent the forward end 44 of the shield 31. In other words, the tools 17 are positioned so that the dirt moved upwardly thereby is adjacent the sides of the shield 31 rather than travelling into the forward end 44 of the shield 31. As the tractor 12 moves forwardly, therefore, the shield 31 travels above a corn row, with the tools 17 acting to break up and turn the soil adjacent to the corn row (Fig. 5).

By virtue of the projection of an upper portion of the body member 21 in each unit 14 in a direction away from the shield 31, and by virtue of the triangular or V-shape of the shield 31, the spaces 46 between each tool support structure 18 and the adjacent side of the shield 31 is large enough to provide for the unrestricted travel therethrough of dirt, clods and trash in the field without clogging such spaces as is the case with present cultivator tool units and shield assemblies. Furthermore, by virtue of their shape, the tools 17 may be positioned closely adjacent the shield 31 since most of the dirt turned upwardly by a shoe 17 is on the side thereof remote from the shield 31.

As a result of the provision of the shoulder 26 in each body member 21 the assembly of the tool 17 with the body member 21 is strengthened so that contact of a tool 17 with a rock or the like is not likely to break the connection of the tool 17 and the body member 21. In other words, a rearward force on the tool 17 is transmitted to the body member 21 at the shoulder 26 so as to reduce the normal shearing forces exerted on the rivet 28. As is well known, the spring assembly 24 also provides for a yieldable upward and rearward movement of the tool 17 on contact with an obstruction.

By virtue of the pivotal support of the shield carrying strap assemblies 32 on the bolts 36, the shield 31 is swingable rearwardly and upwardly on contact with an obstruction such as a rock or a clod. In addition, opposite sides 51 of the shield 31 are curved as indicated at 52 at the front end 44 of the shield 31 to facilitate forward travel thereof.

From the above description it is seen that this invention provides a cultivator tool unit 14 in which a tool 17 is provided with a supporting structure 18 which is curved upwardly and transversely relative thereto. By virtue of this construction of the support structure 18, a tool unit 14 is particularly adapted for use with the cultivator shield 31 to provide for the enlarged spaces 46 facilitating the travel of dirt, clods, trash and the like around the shield 31 without clogging opposite sides of the shield.

Although the invention has been described with respect to a preferred embodiment thereof, it is to be understood that it is not to be so limited, since changes can be made therein which are within the scope of the appended claim.

I claim:

A cultivator attachment comprising a frame and a shield member secured to and depending from said frame, a soil working cultivator unit including a support bar secured to and depending from said frame, said support bar having an upper section thereof extended vertically downwardly from said frame in a spaced relation with one side of said shield and terminating in a lower section having a first portion extended inwardly at an obtuse angle toward said shield, and a second shorter portion extended downwardly and forwardly from said first portion at a position closely adjacent to the lower end of said one side of the shield, said lower section being entirely within the vertical confines of said shield, and a tool member mounted on said second portion of the supporting bar in substantially the same spaced relation with said one side of the shield as said second portion of the bar, said tool member having only a single sweep leg member at the side of the bar remote from the shield and a short leg attached to the forward side of the second portion of the bar to form a continuous extension thereof, said short leg being extended upwardly and rearwardly whereby a lesser part of the soil moved by said tool travels over said short leg and second portion and between the upper section of said bar and said shield, and with the greater part of the soil moved by said tool traveling over said single sweep leg member.

References Cited in the file of this patent
UNITED STATES PATENTS

| | | |
|---|---|---|
| 102,150 | Perry | Apr. 19, 1870 |
| 148,845 | Prout | Mar. 24, 1874 |
| 293,465 | Hopkins | Feb. 12, 1884 |
| 354,381 | Bourne | Dec. 14, 1886 |
| 704,538 | Harmon | July 15, 1902 |
| 816,851 | Eddy | Apr. 3, 1906 |
| 2,320,024 | Anderson | May 25, 1943 |
| 2,417,597 | Hill | Mar. 18, 1947 |
| 2,657,622 | Knuth | Nov. 3, 1953 |
| 2,762,287 | Greiman | Sept. 11, 1956 |